(12) United States Patent
Fischer

(10) Patent No.: US 6,289,933 B1
(45) Date of Patent: Sep. 18, 2001

(54) DIAPHRAGM VALVE

(75) Inventor: Gary A. Fischer, Houston, TX (US)

(73) Assignee: Garitech Systems Inc., Canton, MA (US)

( * ) Notice: Subject to any disclaimer, the term of this patent is extended or adjusted under 35 U.S.C. 154(b) by 0 days.

(21) Appl. No.: 09/631,184

(22) Filed: Aug. 2, 2000

(51) Int. Cl.[7] .................................................. F16K 11/04
(52) U.S. Cl. ............................................. 137/863; 251/331
(58) Field of Search .............................. 137/863; 251/331

(56) References Cited

U.S. PATENT DOCUMENTS

| | | | |
|---|---|---|---|
| D. 394,700 | 5/1998 | Emmins | D23/248 |
| 3,976,104 | 8/1976 | Kehoe | 137/806 |
| 5,222,523 | * 6/1993 | Trimble | 137/863 |
| 5,246,204 | * 9/1993 | Ottung | 251/331 |
| 5,277,401 | 1/1994 | Butler et al. | 251/144 |

* cited by examiner

*Primary Examiner*—John Fox
(74) *Attorney, Agent, or Firm*—Robert A. Koons, Jr.; Matthew P. McWilliams; Pepper Hamilton LLP

(57) ABSTRACT

A diaphragm valve is described, which has a valve body having disposed within it an upper chamber and a lower chamber. The valve body also has first and second connection members that extend from the valve body at substantially a right angle, and where the connection members are hollow and in fluid communication with the upper chamber of the valve body.

The valve comprises: an entrance for admitting a fluid, an exit for passage of the fluid when the fluid is flowing, a draining port for draining of the fluid from the valve, and a passage between the entrance, the exit, and the draining port; wherein the passage is shaped to permit complete draining of the fluid from the valve under force of gravity when the draining port is open.

13 Claims, 5 Drawing Sheets

DIAPHRAGM VALVE

FIELD OF THE INVENTION

The present invention relates to diaphragm valves for use with containers for and conduits of liquids. In particular, the diaphragm valve of the present invention relates to a valve providing substantially no hold up of liquid, the valve being freely draining under force of gravity, and where the valve provides for easy cleaning of the valve interior. The invention also provides a diaphragm valve of unitary construction that has two fluid connectors in fluid communication with the inlet side of the valve seat, so that the valve may be conveniently used for sampling from piping lines or for draining piping lines.

BACKGROUND OF THE INVENTION

Diaphragm valves are known in the art to have various shapes and configurations. Some of these valves are designed for use in interrupting a fluid stream in a fluid conduit, such as tubing or a pipe. Other diaphragm valves are designed specifically for use as drain valves for draining a fluid from a fluid conduit or from a vessel used for containing a fluid. The valve of the present invention is of a new design, and is suited for use either for interrupting fluid flow in a fluid conduit such as a pipe, or for draining a fluid conduit or a fluid-containing vessel. The valve disclosed here is particularly well suited for draining a fluid conduit or a fluid-containing vessel in situations where substantially complete draining of the fluid conduit or vessel is desired, into a second vessel or into a drain.

Diaphragm valves of various types are known. Some of these diaphragm valves are better suited for easy cleaning of the valves than are others. The diaphragm valves known are not designed to be freely draining. Freely draining valves are known in the art, such as the valve disclosed in U.S. Pat. No. 3,976,104 to Kehoe. The valve that is disclosed in that patent is not a diaphragm valve however, and the valve of Kehoe works in a different manner than that of the valve disclosed here.

To overcome such shortcomings, a diaphragm valve is disclosed here that provides a construction that is particularly well suited for applications that require complete draining of a valve.

To overcome the shortcomings of known diaphragm valves above, and to satisfy the outstanding needs outlined above I have now discovered a new diaphragm valve construction.

SUMMARY OF THE INVENTION

Briefly, the invention is a diaphragm valve that is completely draining, when used in a loop piping system. The new diaphragm valve comprises a fluid inlet; a fluid outlet; a passageway for passing a fluid between the fluid inlet and the fluid outlet; a fluid drainway, disposed below the passageway, and below the fluid inlet and the fluid outlet; and a valve seat, the valve seat being intermediate the passageway and the drainway and in fluid communication with both. The passageway and the drainway of the valve are contoured without a depression below grade, for allowing a droplet of the fluid along any surface point either in the passageway or in the drainway, to flow to a succession of lower surface points under the force of gravity, leaving the valve at the fluid drainway.

The new diaphragm valve also comprises an interior surface, the surface formed without a pocket, a crevice, or a depression below grade. A fluid droplet along any interior surface point of the valve flows to a plurality of successively lower surface points under the force of gravity. That is, a fluid droplet, lying along any interior surface point of the valve, will be able to flow under gravity to successively lower points along the interior of the valve until the droplet flows from the valve. There is an absence of depressions in the interior surface wherein a fluid droplet can flow, but from which the droplet cannot continue further downward to drain from the valve.

Fluid flows from the inventive valve to allow the valve to freely drain. That is, a droplet of the fluid along any interior surface point of the valve, flows to a succession of successively lower surface points under the force of gravity, leaving the valve at the fluid drainway, with substantially no hold up of fluid in the valve. By interior surface is meant the interior of the valve body, such as the passageway intermediate the fluid inlet and the fluid outlet, and the fluid drainway and any fluid communication opening between the drainway and the valve seat.

It is accordingly an aspect of the invention to provide a diaphragm valve where the valve is completely draining under force of gravity.

It is another aspect of the invention to provide a diaphragm valve that is readily cleaned, and that is completely draining under force of gravity as well.

It is another aspect of the invention to provide a diaphragm valve with a unitary construction that is substantially completely draining.

It is yet another aspect of the invention to provide a new diaphragm valve for use in pharmaceutical manufacturing, where there are regulatory requirements, such as for ease of cleaning and lack of hold-up in process equipment used in such manufacturing.

It is yet another aspect of the invention to provide a new diaphragm valve that has on its interior surfaces no depressions that can hold a fluid from draining freely from the valve under force of gravity.

It is still another aspect of the invention to provide a diaphragm valve that can be used for interruption of flow of a fluid in a fluid conduit, or that can be used as the user selects, for draining a fluid from a fluid holding vessel into a second vessel.

It is still another aspect of the invention to provide a diaphragm valve has a low dead-leg volume, sometimes referred to in the art as crossover volume.

These aspects, and others set forth more fully below are achieved by the present invention. In particular, a new diaphragm valve is disclosed that substantially eliminates hold up of a fluid within the valve, when the valve is drained, by having the valve be self draining.

DETAILED DESCRIPTION OF THE INVENTION

I have developed a new and improved diaphragm valve, the new valve being well suited for use in applications requiring complete drainage of a fluid conveying pipe. The new and improved diaphragm valve is also to be understood as useful in draining a fluid containing vessel of a fluid. The new diaphragm valve will be understood more clearly by reference to the accompanying drawings.

Figure 1:
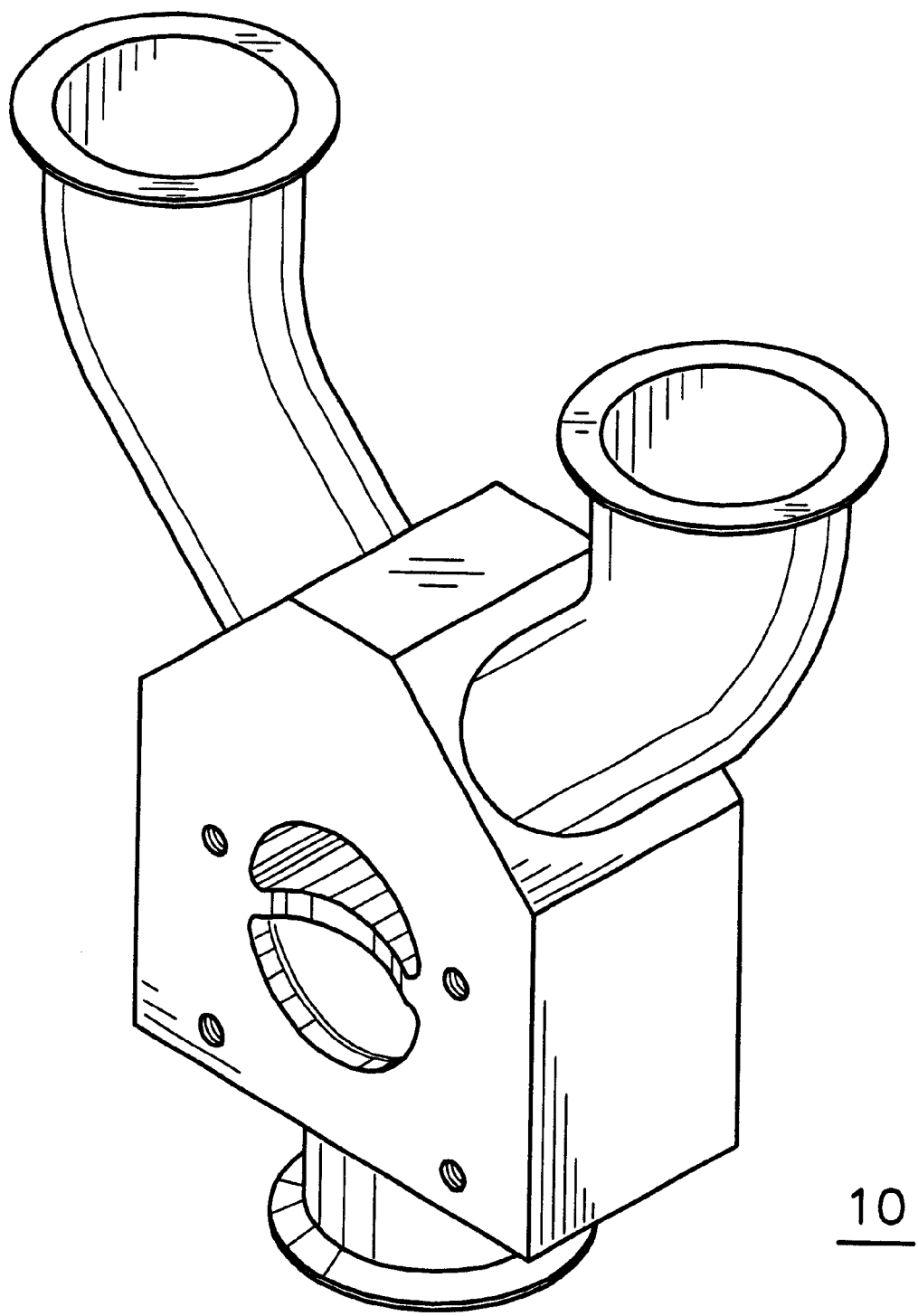
FIG. 1 is an illustration of a perspective view of a first embodiment of a diaphragm valve according to the invention.

With reference to these drawings, wherein like reference numerals designate similar parts throughout the various views, 10 designates a perspective view of a first embodiment of the new valve disclosed here, as depicted in FIG. 1.

Figure 2:
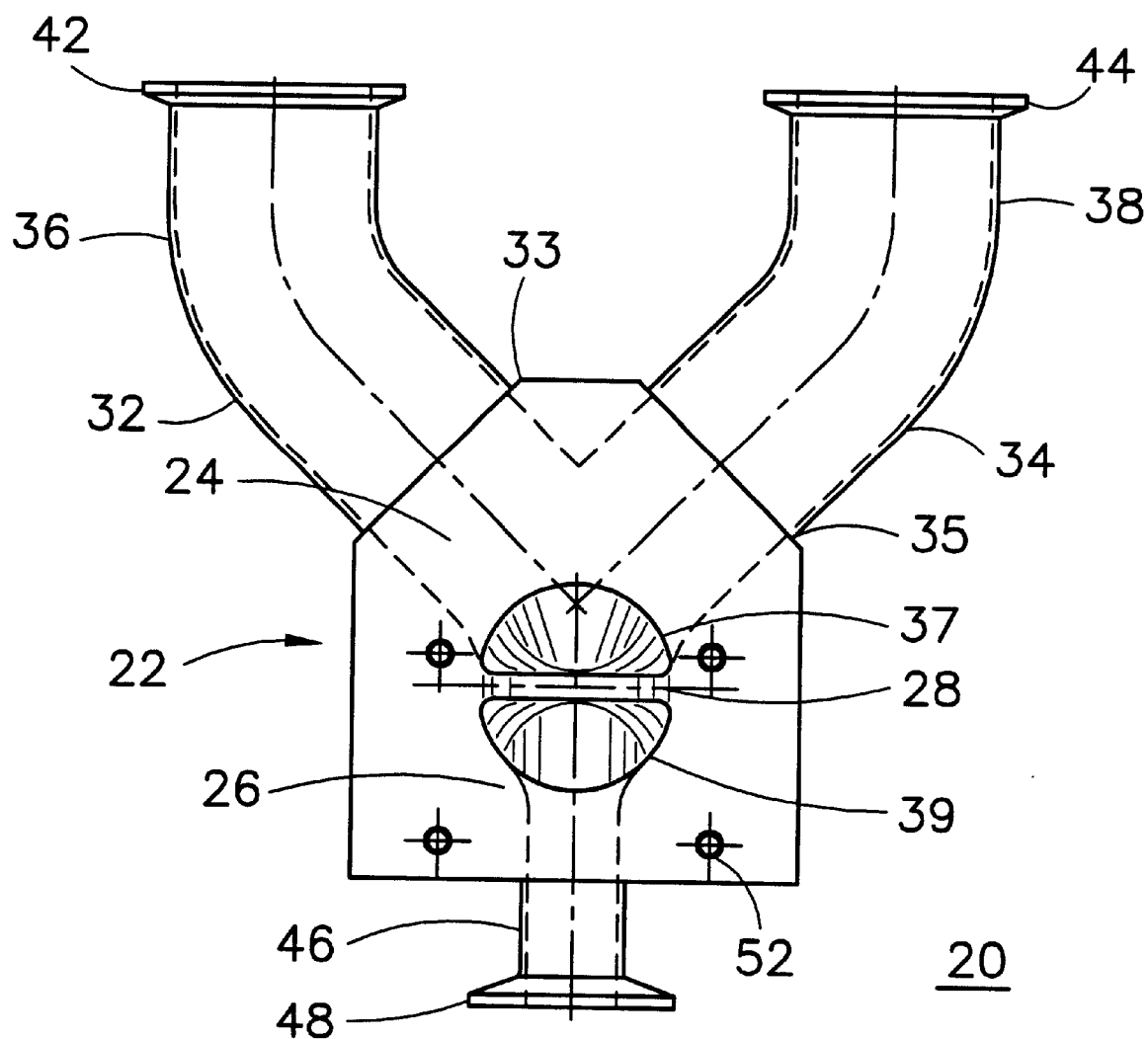
FIG. 2 is an illustration of a front elevation view of the first embodiment.

In FIG. 2 may be seen a front elevation view 20 of a first embodiment of the valve 22 according to the invention. The number 35 designates the valve body, and the valve body has a top 33. The number 24 designates the passageway between the fluid inlet 32 and the fluid outlet 34. The valve body 35 has been bored to form a passageway 24 interior to the valve body 35. The passageway 24 extends upwardly to the fluid inlet 32 and the fluid outlet 34. The passageway 24 also extends downwardly to terminate at a valve seat 28. The valve seat 28 is preferably arcuate in shape, to provide mating with a diaphragm, not shown, the diaphragm readily selected and arranged for use with the new valve by one skilled in the art of diaphragm valve construction.

Disposed at the bottom of the valve body 35 is a drainway 46. This drainway 46 is in fluid communication with the valve seat 28, and allows the fluid to be drained from the passageway when the diaphragm is not in contact with the valve seat 28. The fluid communication between the drainway 46 and the valve seat 28 is through a lower interior chamber 26, that is disposed intermediate the valve seat and the drainway.

The valve body 35 optionally has a plurality of mounting bores 52, for allowing the valve body to be fastened to a support for a diaphragm for closing the valve.

The passageway 24 flares upwardly toward the fluid inlet and the fluid outlet. The passageway may be seen in the embodiment shown to have a contour that flares in a continuously upward manner, without a pocket, without a crevice, without a cavity, and without a depression below grade. Without a place for a droplet of a fluid to collect below grade, a path of downward fluid flow by gravity from any point along a surface of the passageway passes only to the drainway 46 in a progressively downward direction.

Draining of fluid from any point along the surface of the passageway 24 to any lower point below the valve seat is along an uninterrupted downward drainage path. The valve seat 28 forms a weir for the flow of the fluid from the passageway 24 to the drainway 46. This weir may be closed to fluid flow by compression of a suitably selected diaphragm against the valve body 35 at the valve seat 28. The diaphragm is preferably sized to allow it to sealingly fit against an upper weir port 37 and also against a lower weir port 39.

The valve seat 28 is disposed relative to the fluid inlet 32 and fluid outlet 34 such that the cross sectional area of the passageway 24 is substantially constant, as a fluid passes from the fluid inlet 32 to the fluid outlet 34. The constancy of the cross sectional area provides the new diaphragm valve with substantially no crossover volume or dead-leg volume.

For most advantageous operation of the new diaphragm valve, it is preferred that the fluid inlet 32 and the fluid outlet 34 extend from the valve body to each form an angle from the vertical of from about 10 degrees to about 80 degrees. More preferably, the fluid inlet 32 and the fluid outlet 34 extend from the valve body to each form an angle from the vertical of from about 30 degrees to about 60 degrees. Most preferably, the fluid inlet 32 and the fluid outlet 34 extend from the valve body to each form an angle from the vertical of about 45 degrees.

Attachment of the new valve to pipes or to a tank may be by any of the methods known in the art for attachment of diaphragm valves. These methods include connection by butt welding, or by using clamps or couplings. Since a preferred embodiment of the new valve has the fluid inlet 32 and the fluid outlet 34 extend upwardly from the valve body 35, it would be desirable to for a user of the valve to make a connection at an angle other than that used for a given fluid inlet and a given fluid outlet. In circumstances when the angle for a connection is to be changed, a valve can be constructed according to the teachings of the present invention, with the valve comprising either or both a fluid inlet extension 36 and a fluid outlet extension 38, as shown in FIG. 1. These extensions serve to effectively change the direction needed for connections to the fluid inlet 32 and the fluid outlet 34. In the embodiment shown, the fluid inlet extension 36 and a fluid outlet extension 38 are both in a vertical direction, thereby allowing connection of the valve shown to vertical piping.

For circumstances where a valve constructed according to the teachings of the present invention is to be connected by use of clamps, the valve may optionally be constructed with flanges 42, 44, and 48, the flanges depending respectively from the fluid inlet 32, the fluid outlet 34, and the drainway 46.

Figure 3:
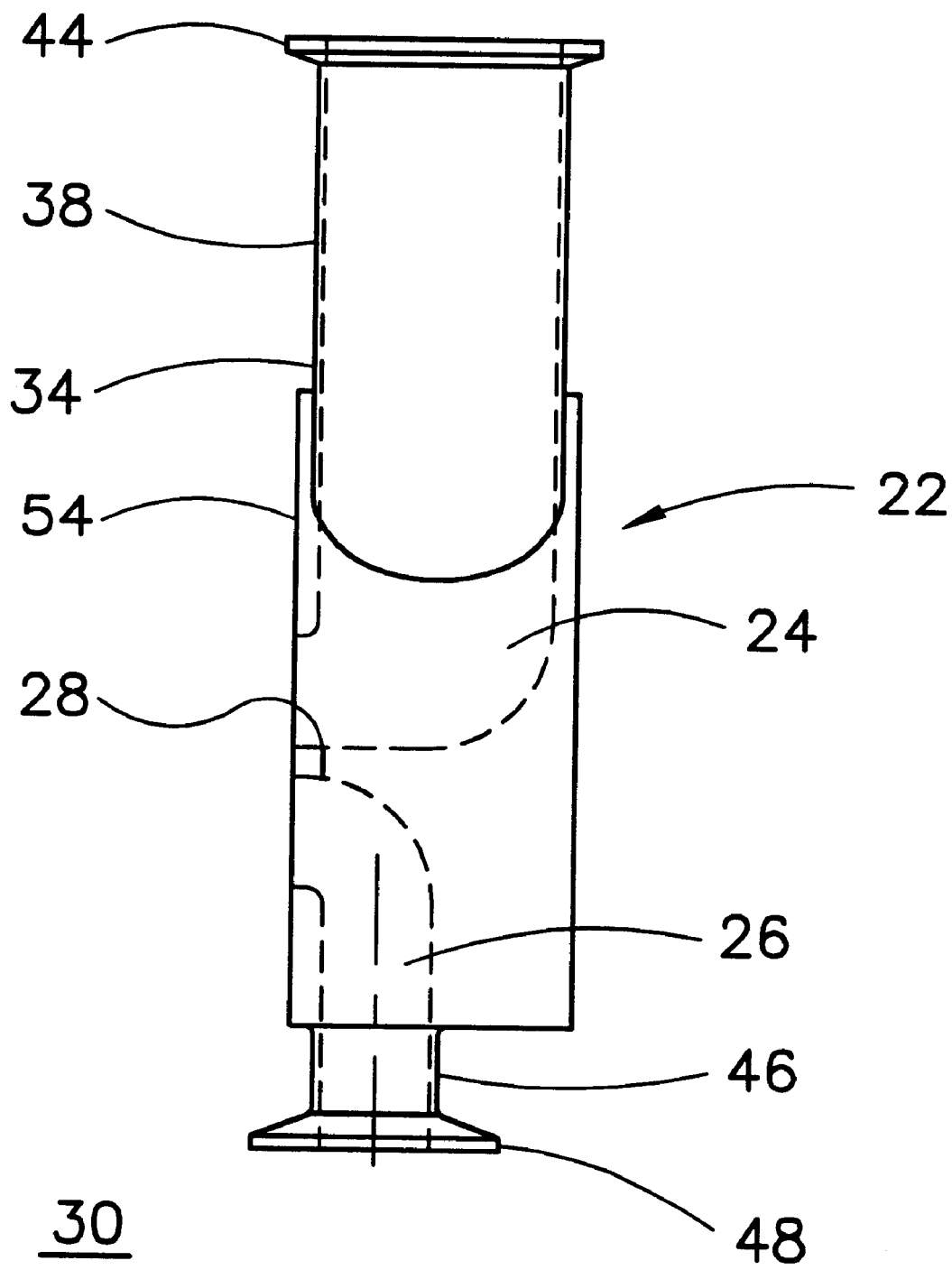
FIG. 3 is an illustration of a side elevation view of the first embodiment.

FIG. 3 depicts a side elevation view 30 of the valve 22 of FIG. 1. The view in FIG. 3 shows how the contour of the passageway 24 and of the lower interior chamber 26 can allow for unimpeded flow of a droplet of a fluid from any point in the passageway 24 to the drainway 46 without encountering a depression of any sort below grade. FIG. 3 also depicts this embodiment having a valve face 54 that serves as a substantially planar surface against which a diaphragm may be mounted.

Figure 4:
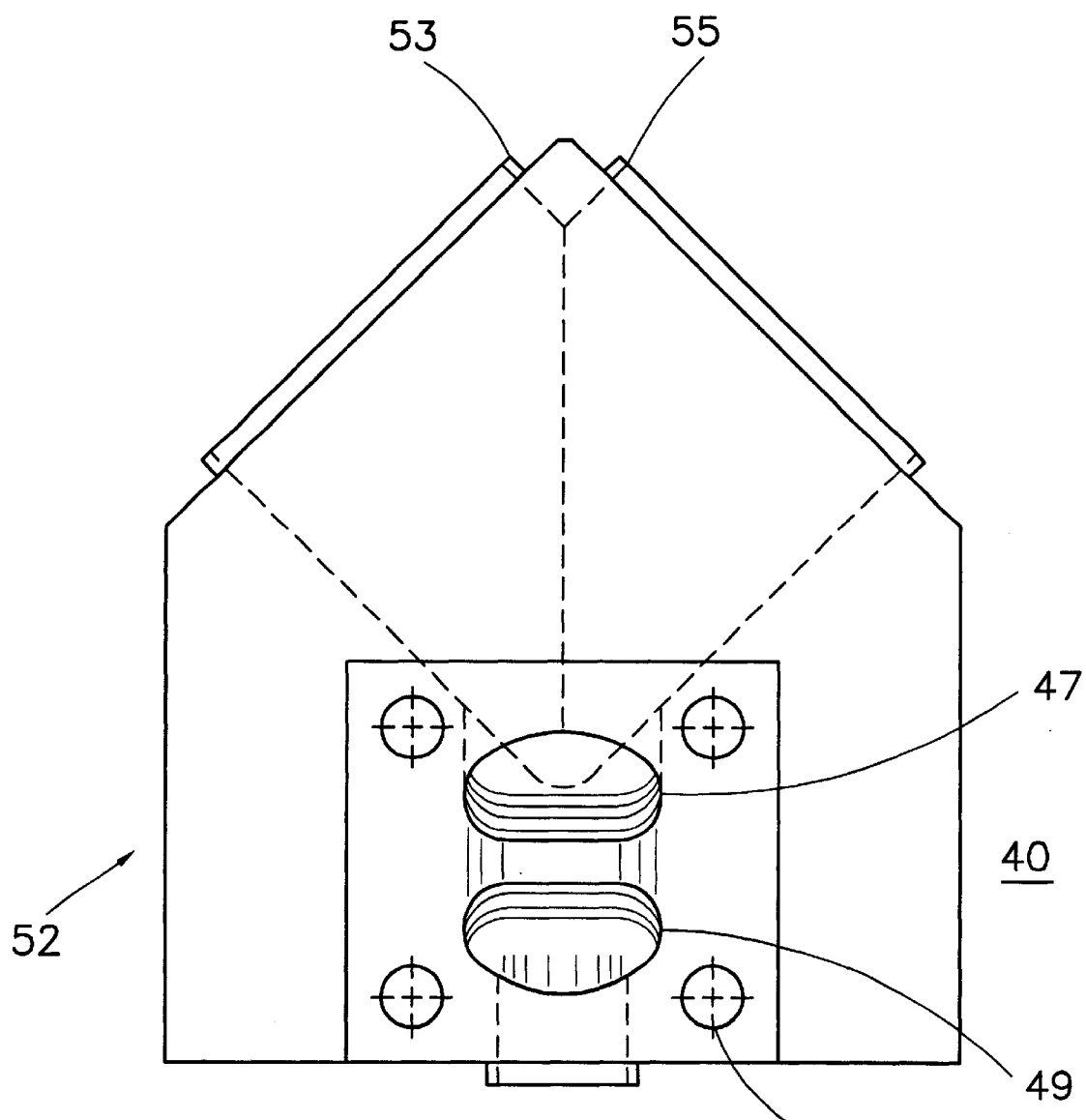
FIG. 4 is an illustration of a front elevation view of a second embodiment of a diaphragm valve according to the invention.

Turning now to FIG. 4, a front elevation view 40 of a second embodiment 52 of a diaphragm valve according to the invention may be seen. In this embodiment the elements of the valve construction are similar to those for the embodiment of FIG. 2. In this second embodiment however, the fluid inlet 53 and the fluid outlet 55 are short, compared to that of the previous embodiment. That is, they do not extend far from their valve body, and they do not have the flanges shown for the first embodiment above. This embodiment does have a an upper weir port 47 and a lower weir port 49. A plurality of mounting bores 62 are also shown.

Figure 5:
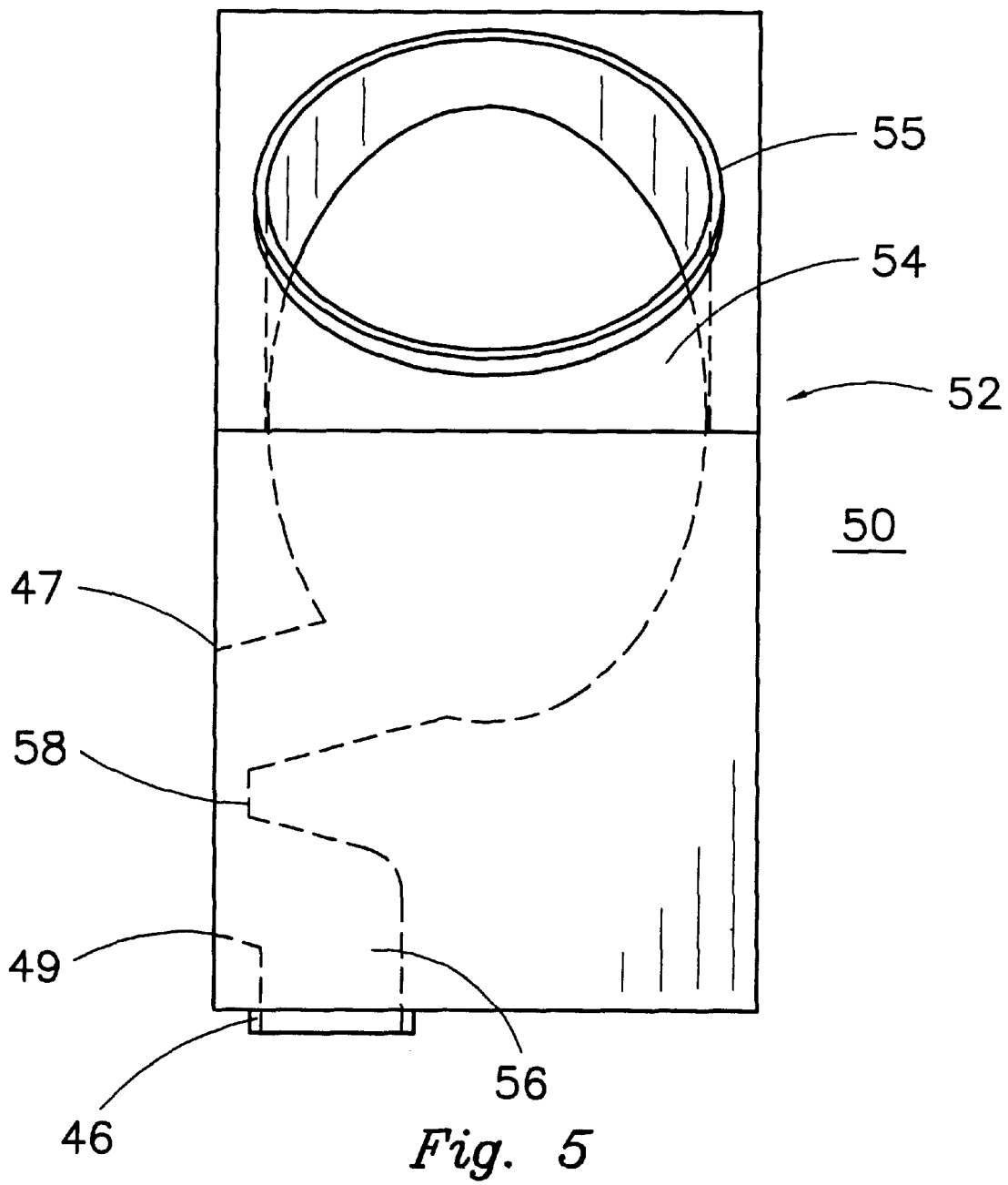
FIG. 5 is an illustration of a side elevation view of the second embodiment.

FIG. 5 illustrates a side elevation view 50 of the embodiment of FIG. 4. The arrangement of the passageway 54, the drainway 56, and the valve seat 58 for this embodiment may be seen. The valve seat 58 is disposed at a height in the valve that is selected to minimize the crossover volume. That is, the upper weir port 47 and valve seat 58 are positioned in the valve to minimize the volume within the valve and between the valve seat 58 and the passageway 54.

A diaphragm valve made in accordance with the teachings of the present invention may be of unitary construction. As is shown in FIGS. 4 and 5, such a valve ay be machined from a single block of metal, for example. The passageway for a valve according to the invention may be advantageously formed in its major portion by boring into a valve body along the axis of the fluid inlet and that of the fluid outlet.

By having the contour of the passageway allow for a droplet of fluid a path of downward fluid flow from any point along a surface of the passageway, only to the drainway in a progressively downward direction, a diaphragm valve is achieved with substantially no crossover volume. That is, the amount of undrained fluid from a valve according to the invention, when the valve is allowed to drain freely under force of gravity, is reduced to an unobjectionable or negligible amount. This is sometimes referred to in the art as freely draining with zero dead-leg volume.

The inventive valve comprises: an entrance or fluid inlet for admitting a fluid, a fluid outlet for passage of the fluid when the fluid is flowing, a draining port, or drainway, for draining of the fluid from the valve, and a passageway between the fluid inlet, and the fluid outlet, wherein the passageway is shaped to permit complete draining of the fluid from the valve under force of gravity when the draining port is open.

For the present invention, a valve is disclosed that has advantages over a conventional diaphragm valve. In particular, the new valve is a diaphragm valve that is freely draining under force of gravity, to allow substantially no crossover volume or dead-leg volume.

The present invention is not to be limited in scope by the embodiments disclosed herein, which are intended as single illustrations of one aspect of the invention, and any which are functionally equivalent are within the scope of the invention. Indeed, various modifications of the invention, in addition to those shown and described herein, will become apparent to those skilled in the art from the foregoing description. Such modifications are intended to fall within the scope of the appended claims. All patents and any publications mentioned herein are hereby incorporated by reference.

I claim:

1. A diaphragm valve, comprising:
   a fluid inlet;
   a fluid outlet;
   a passageway for a fluid therebetween;
   a fluid drainway, disposed below the passageway and below the fluid inlet and the fluid outlet; and
   a valve seat intermediate the passageway and the drainway and in fluid communication with both the passageway and the drainway, the valve seat closable by a diaphragm;
   wherein the passageway and the drainway are contoured without a depression below grade, for allowing a droplet of the fluid along any surface point either in the passageway or in the drainway, to flow to a succession of lower surface points under the force of gravity, leaving the valve at the fluid drainway, and
   wherein the fluid inlet and the fluid outlet each depend upwardly from the valve to form an angle of from about 10 degrees to about 80 degrees with the vertical.

2. The diaphragm valve according to claim 1, wherein the valve seat is arcuate.

3. The diaphragm valve according to claim 2, wherein the angle is from about 30 to about 60 degrees.

4. The diaphragm valve according to claim 3, wherein the angle is about 45 degrees.

5. The diaphragm valve according to claim 1, the fluid inlet further comprising: an inlet extension; and the fluid outlet further comprising an outlet extension; wherein the inlet extension and the outlet extension each depend upwardly from the diaphragm valve.

6. The diaphragm valve according to claim 5, wherein at least one of the fluid inlet and the fluid outlet terminates with a flange.

7. A diaphragm valve, comprising:
   a valve body having an exterior and an interior, the interior having
   a passageway between a fluid inlet and a fluid outlet, the passageway in fluid communication with a valve seat;
   a drainway, the drainway in fluid communication with the valve seat, and the drainway being disposed below the fluid inlet and the fluid outlet, and the valve seat being intermediate the passageway and the drainway;
   wherein the passageway and the drainway are contoured so that a path of fluid flow under force of gravity, from any point along a surface of the passageway passes only to the drainway in a progressively downward direction, and
   wherein the fluid inlet and the fluid outlet each depend upwardly from the valve to form an angle of from about 10 degrees to about 80 degrees with the vertical.

8. The diaphragm valve according to claim 7, wherein the valve seat is arcuate.

9. The diaphragm valve according to claim 7, wherein the passageway and the drainway are without a depression below grade from which a fluid droplet cannot flow downward to exit from the drainway.

10. The diaphragm valve according to claim 7, wherein the fluid inlet and the fluid outlet each form an angle with the vertical of from about 30 to about 60 degrees.

11. The diaphragm valve according to claim 10, the fluid inlet and the fluid outlet each form an angle with the vertical of about 45 degrees.

12. The diaphragm valve according to claim 11, wherein the diaphragm valve is of unitary construction.

13. A diaphragm valve that is completely draining, comprising:
   a valve body, having an interior passageway, and a lower interior chamber, the passageway and the lower interior chamber meeting at a valve seat, the valve seat being intermediate the passageway and the lower interior chamber;
   a fluid inlet and a fluid outlet, the fluid inlet and fluid outlet disposed upwardly above the valve seat, in fluid communication with the passageway, and each of the fluid inlet and fluid outlet forming an angle of less than about 80 degrees with the vertical; and
   a drainway disposed below the valve seat and in fluid communication with the valve seat;
   wherein a fluid droplet, along the interior passageway and the lower interior chamber of the valve, flows to a plurality of successively lower surface points under the force of gravity until leaving the valve.

* * * * *